(12) United States Patent
Marx et al.

(10) Patent No.: US 8,911,523 B2
(45) Date of Patent: Dec. 16, 2014

(54) WATER SEPARATING CONTAINER FOR A MOTOR VEHICLE

(75) Inventors: Guenther Marx, Armsheim (DE); Helmut Nitzsche, Ober-Hilbersheim (DE); Guenter Boersch, Halsenbach (DE)

(73) Assignee: GM Global Technology Operations LLC, Detroit, MI (US)

( * ) Notice: Subject to any disclaimer, the term of this patent is extended or adjusted under 35 U.S.C. 154(b) by 129 days.

(21) Appl. No.: 13/526,828

(22) Filed: Jun. 19, 2012

(65) Prior Publication Data

US 2012/0324846 A1 Dec. 27, 2012

(30) Foreign Application Priority Data

Jun. 21, 2011 (DE) .......................... 10 2011 105 131

(51) Int. Cl.
| | | |
|---|---|---|
| *B01D 47/00* | (2006.01) | |
| *B60H 1/28* | (2006.01) | |
| *F02M 35/08* | (2006.01) | |
| *F02M 35/16* | (2006.01) | |
| *F02M 35/10* | (2006.01) | |
| *B60H 1/00* | (2006.01) | |

(52) U.S. Cl.
CPC ........... *F02M 35/088* (2013.01); *F02M 35/161* (2013.01); *B60H 1/28* (2013.01); *F02M 35/10354* (2013.01); *B60H 2001/00085* (2013.01)
USPC ................ 55/385.3; 55/392; 55/413; 55/423; 55/426; 55/462; 123/198 E; 210/342; 210/487; 210/338; 210/497.01

(58) Field of Classification Search
USPC ......... 55/385.3, 484, 498, 502, 510, 497, 508, 55/283, 514, DIG. 28; 95/273; 123/198 E; 210/342, 487, 338, 497.01
See application file for complete search history.

(56) References Cited

U.S. PATENT DOCUMENTS

| | | | | |
|---|---|---|---|---|
| 2,080,574 | A * | 5/1937 | McCoy | 96/210 |
| 2,962,121 | A * | 11/1960 | Wilber | 55/480 |
| 3,013,628 | A * | 12/1961 | Jacobs et al. | 422/173 |
| 4,437,393 | A | 3/1984 | Stolz et al. | |
| 5,669,986 | A | 9/1997 | Buchanan, Jr. et al. | |
| 8,052,780 | B2 * | 11/2011 | Rotter et al. | 95/273 |
| 8,419,834 | B2 * | 4/2013 | Rotter et al. | 95/268 |
| 2006/0064991 | A1 | 3/2006 | Kozak et al. | |

FOREIGN PATENT DOCUMENTS

| | | |
|---|---|---|
| DE | 3619935 A1 | 12/1987 |
| DE | 4239171 C1 | 10/1993 |
| DE | 4401022 C1 | 2/1995 |
| DE | 19756983 C1 | 11/1998 |
| DE | 19734146 A1 | 2/1999 |
| DE | 10351641 B3 | 2/2005 |

(Continued)

*Primary Examiner* — Robert Clemente
*Assistant Examiner* — Minh-Chau Pham
(74) *Attorney, Agent, or Firm* — Ingrassia Fisher & Lorenz, P.C.

(57) ABSTRACT

A water separating container for a motor vehicle is provided. An air stream sucked in from outside the vehicle passes through the water separating container, which separates water present in the air stream. The water separating container includes an air inlet having an air inlet opening and an air outlet having an air outlet opening. An impact wall for separating the water present in the air stream is disposed between the air inlet and the air outlet.

19 Claims, 6 Drawing Sheets

(56) References Cited

FOREIGN PATENT DOCUMENTS

| DE | 102004051198 B3 | 6/2006 |
| DE | 102007013690 A1 | 11/2007 |
| DE | 102008039089 A1 | 4/2009 |
| DE | 102007062158 A1 | 6/2009 |
| DE | 102008058183 A1 | 5/2010 |

* cited by examiner

Longitudinal Section A-A

WATER SEPARATING CONTAINER FOR A MOTOR VEHICLE

CROSS-REFERENCE TO RELATED APPLICATION

This application claims priority to German Patent Application No. 10 2011 105 131.0, filed Jun. 21, 2011, which is incorporated herein by reference in its entirety.

TECHNICAL FIELD

The technical field generally relates to a water separating container for a motor vehicle, for separating water from moist air. The technical field further relates to a motor vehicle having such a water separating container.

BACKGROUND

DE 10 2008 058 183 A1 describes an air guiding arrangement for a blower system of a heating and/or air-conditioning system of a motor vehicle. In this case, a water separating area for the air guiding arrangement is located in the interior of a fender of the motor vehicle. The air guiding arrangement described in DE 10 2008 058 183 A1 has the disadvantage that it must be provided at a certain position in the vehicle, here in the interior of the fender, since the fender interior has such an overall height in order to achieve gravitational separation of water or dirt from the sucked-in air.

Against this background, it is at least one object to provide an improved water separating device for separating, in particular, water from moist air. In addition, other objects, desirable features and characteristics will become apparent from the subsequent summary and detailed description, and the appended claims, taken in conjunction with the accompanying drawings and this background.

SUMMARY

A water separating container for a motor vehicle is provided. The water separating container passes through an air stream sucked in from outside the vehicle and separates water present in the air stream. The water separating container comprises an air inlet which has at least one air inlet opening and an air outlet having at least one air outlet opening, comprising an impact wall for separating the water present in the air stream.

A motor vehicle having an air guiding and water separating system is also provided.

The water separating container contemplated herein provides an impact wall upon which moist air impacts when passing air through the water separating container, where the water contained in the moist air can collect on the impact wall and be led off. Water contained in moist air can be separated and led off in a simple manner at the impact wall of the water separating container. The water separating function in this case is independent of the position of the water separating container in the vehicle.

In one embodiment, the water separating container is configured to deflect air flowing into the water separating container through the air inlet, for example, at an angle β in a range between 80° and 110°, and guide it to the air outlet. The air outlet can be coupled, for example, to an air-conditioning and/or ventilation module. The air outlet is provided laterally offset, for example, to the air inlet in the water separating container so that the air inlet and the air outlet overlap or no overlap is given. Furthermore, the air outlet can be disposed at least partially or completely below the air inlet in the water separating container.

In another embodiment, the water separating container is configured to be multipart, and comprises at least one first upper and one second lower housing half. The lower housing half, for example, comprises the air inlet, the impact wall, and a water drain and the upper housing half comprises the air outlet and a receptacle for receiving and holding the impact wall. The two housing halves can, for example, be manufactured simply and cost-effectively from plastic, for example, in a tangential injection molding process and then preferably joined tightly to one another. However, a one-part configuration of the water separating container would also be feasible.

In a further embodiment, the air outlet opening is provided with a shielding wall or a shell, which extends at least along the lower side of the air outlet opening. The shielding wall forms a type of overflow edge, which counteracts an undesired flow of water through the air outlet opening.

In an embodiment, the impact wall is disposed in the transverse direction of the water separating container and terminates with a wall section of the water separating container or forms a gap with this. The impact wall is preferably disposed above the air outlet.

In a further embodiment, the air outlet is provided elevated with respect to the base of the water separating container and in particular a water drain of the water separating container.

In an embodiment of the motor vehicle, the water separating container for separating water from moist air is disposed on the side of the passenger compartment of the motor vehicle and is connected to a water receiving system in the engine compartment of the motor vehicle. The water separating container is preferably disposed in the passenger compartment of a motor vehicle, in particular below a dashboard and is connected to an interior insulation of the motor vehicle. The water separating container is coupled to a water receiving system which is provided in an engine compartment of the vehicle.

The above embodiments and further developments can be arbitrarily combined with one another if appropriate. Further possible embodiments, further developments, and implementations also cover combinations of features described previously or in the following with reference to the exemplary embodiments, not explicitly mentioned. In particular, the person skilled in the art will also add individual aspects as improvements or additions to the respective basic form of the water separating container contemplated herein.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses of the various embodiments. Furthermore, there is no intention to be bound by any theory presented in the preceding background or the following detailed description.

Figure 1:
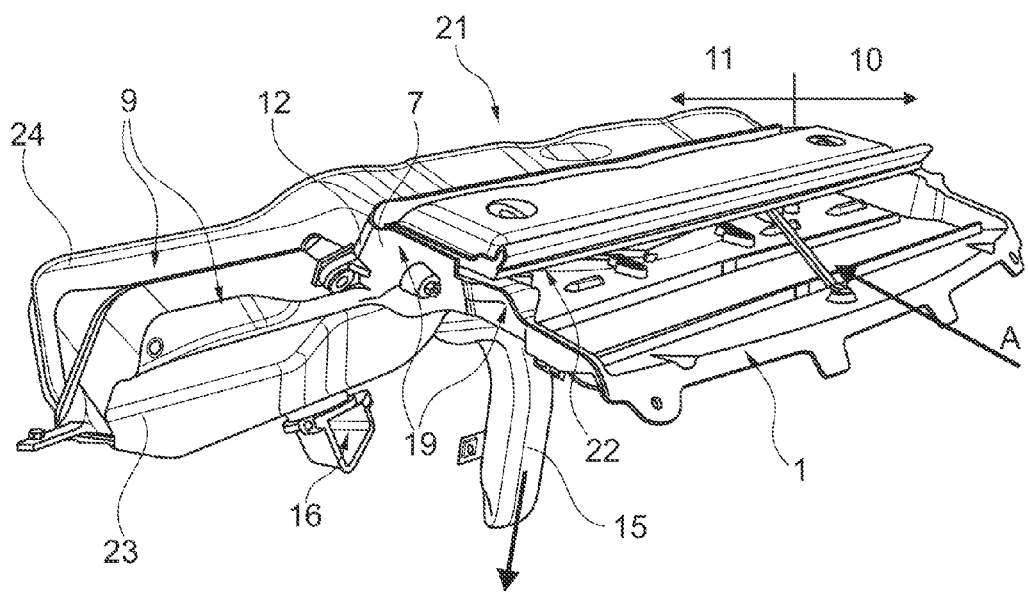
FIG. 1 shows a perspective view of an inner water receiving device according to an embodiment, which is connected to an outer water receiving device for a vehicle.

FIG. 1 shows a perspective view of an embodiment of an inner water separating container 9 for a vehicle, in particular a motor vehicle, which can be coupled to an outer water receiving device 1 (outer plenum) and an outer water receiving container 7 (outer secondary plenum).

A system for water separation in vehicles having an extended windshield typically is capable of receiving amounts of water, for example, for a universal water cabin test (end of line testing) of up to 40 gallons per minute, which corresponds to 181.84 liters (l) per minute.

In order to satisfy the requirements for a maximum drainage capacity for a universal water cabin test of 40 gallons per minute, the water received in the outer water receiving device 1 (main plenum) should run through the water receiving device 1 as expected as late as possible, for example, with a water throughput time t of t≥18 s.

The maximum drainage capacity is defined in such a manner that the outer water receiving device 1 and 7 (outer main plenum 1 and outer secondary plenum 7) has a water receiving capacity of about 35 gallons of water per minute, which corresponds to 159.11 l per minute and the inner water separating container 9 has a water receiving capacity of 5 gallons of water per minute, which corresponds to 22.73 l of water per minute.

The inner water separating container 9 shown in the exemplary embodiment in FIG. 1 is disposed in the passenger compartment 11 and the outer water receiving device 1 (main plenum) and the outer water receiving container 7 (outer secondary plenum) are disposed in an engine compartment 10 of the vehicle and are used to receive, for example, large quantities of water, for example, rain water which can collect on a front windshield or washing water used to clean the vehicle. The outer water receiving device 1 (outer plenum) can at the same time be used as an air inlet for sucking in air through an air-conditioning and ventilation module of the vehicle, for example, an HVAC module. An HVAC module is a heating, ventilation, and air conditioning module and is normally disposed on the side of the passenger compartment in the vehicle.

A water drain 8 can be provided, for example, on the inner water receiving device 9 (inner plenum) and in the outer water receiving container 7 (outer secondary plenum), as shown in FIG. 1, or in one of the two.

The inner water separating container 9 is used to separate water from sucked-in air when this is moist and, for example, to convey the air further to a connected air conditioning and ventilation module, e.g. an HVAC module. From there the air is then guided inwards into the passenger compartment 11. Normally the air is sucked in by means of at least one blower of the air conditioning and ventilation module from outside the vehicle and is initially passed through the outer water receiving device 1 and the outer water receiving container 7 connected thereto (outer secondary plenum) and then passed to the inner water separating container 9. There, the moisture of the air, if present, can be separated and the air can be supplied further to the air conditioning and ventilation module and from there inward into the passenger compartment 11.

As shown in the exemplary embodiment in FIG. 1, the housing of the inner water separating container 9 is, for example, designed as multipart and, for example, has one first or lower and one second or upper housing half 23, 24. The first or lower housing half 23 can be connected to a front wall of the vehicle, which separates the engine compartment 10 and the passenger compartment 11. Furthermore, the lower housing half 24 has one or more air inlet openings, which are coupled to one or more air passage openings of the outer water receiving container (outer secondary plenum) for guiding air from the outer water receiving device 1 and the outer water receiving container 7 connected thereto (outer secondary plenum) into the inner water separating container 9.

Figure 2:
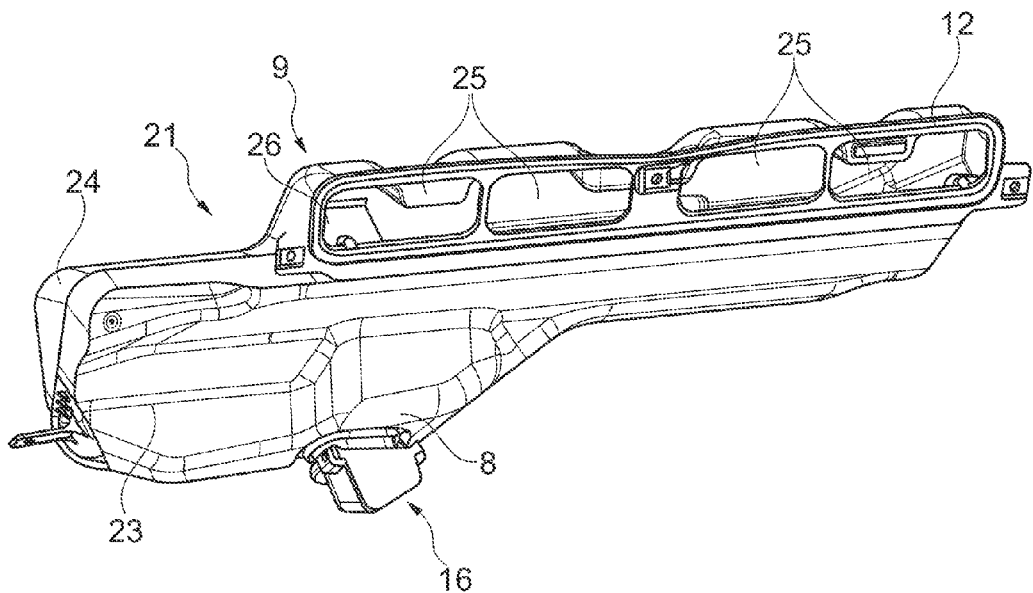
FIG. 2 shows a perspective view of the inner water receiving device according to FIG. 1.

FIG. 2 shows a perspective view of the inner water separating container 9 from FIG. 1. The inner water separating container 9 (inner plenum or inner main plenum) comprises, as described previously, a first or lower housing half 23 and a second or upper housing half 24. As shown in the exemplary embodiment in FIG. 2, the lower housing half 23 has a plurality of openings or air inlet openings 25 for introducing air. Furthermore, an additional sealing device 12 is optionally provided for sealing the inner water separating container 9 with respect to the front wall of the vehicle, which separates the passenger compartment in which the inner water separating container 9 is located, from the engine compartment. In addition, for example, the lower housing half 23 has an additional water drain 8 for removing water. The water drain 8 can in this case additionally have a separating or valve device, e.g. a valve flap 16 or reed valve device. The valve flap 16 or reed valve device allows the water to flow outward from the water separating container 9 via the water drain 8 but prevents water from flowing back into the water drain 8 and therefore into the inner water separating container 9. The valve flap 16 can be formed integrally with the water drain 8 of the inner water separating container 9 or be fastened to this as a separate part, as shown in the exemplary embodiment in FIG. 2.

The water that has been separated via the moist air and furthermore, water that has penetrated from the outer water receiving device or the outer water receiving container (outer secondary plenum) into the inner water separating container 9 can be removed via the drain 8.

The inner water separating container 9 can, for example, remove up to 20% of the entire amount of water received by the outer water receiving device such as, for example, rain water, washing water, moisture from the air, etc. The outer water receiving device and the outer water receiving container (outer secondary plenum) can in turn remove at least 80% of the water received by the outer water receiving device (e.g. at the maximum swallowing capacity of 40 gallons per min) without this water being able to penetrate further into the inner water separating container 9.

The inner water separating container 9 has at least one additional impact wall 26 for separating water from moist air.

Figure 3:
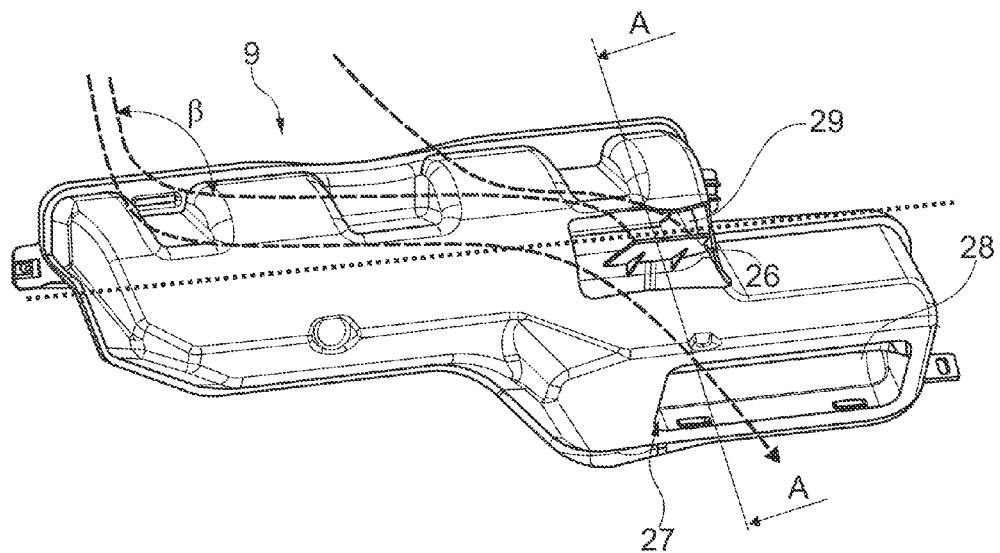
FIG. 3 shows another perspective view of the inner water receiving device according to FIG. 1.

FIG. 3 shows another perspective view of the inner water separating container 9 according to FIGS. 1 and 2, where the inner water separating container 9 is shown with a cutaway in order to show the impact wall 26. As indicated by dashed arrows, the air flows through the air inlet openings into the inner water separating container 9 and is deflected, for example, by an angle β in a range of 80° to 110°, in particular 90°. The angle β is the angle between the air stream flowing into the inner water separating container 9 and the air stream then deflected in the water separating container 9.

Part of the air impinges upon or impacts upon the impact wall 26 and water contained in the moist air can collect on the impact wall 26 and from there is passed to the water drain, for example, to the lowest position of the inner water separating container 9 and from there is guided out from the inner water separating container 9 and from the vehicle.

The air whose moisture has at least been reduced or substantially completely extracted, can in turn flow further through at least one air outlet opening 27 of the inner water separating container 9, e.g. into a connected air conditioning and ventilation module, e.g. an HVAC module. The air outlet opening 27 is optionally provided at least on its underside and if desired, additionally on at least one side with a shielding wall 28 or shell, which additionally shields the air outlet opening 27 with respect to the water drain and the base of the inner water separating container 9 and forms an overflow edge.

As shown in the exemplary embodiment in FIG. 3, the impact wall 26 terminates, for example, with a wall section 29 of the inner water separating container 9. Likewise however, a passage or gap (not shown) can be provided between the impact wall 26 and the wall section 29 of the inner water separating container 9, between which the water collected on the impact wall 26 can run off in the direction of the drain.

The impact wall 26 is preferably disposed in the transverse direction or substantially in the transverse direction of the inner water separating container 9. A transverse axis of the water separating container 9, which runs through the impact wall 26, is indicated by a dotted line in FIG. 3.

Furthermore, the impact wall 26 is, for example, located above the air outlet opening 27. The air outlet opening 27 is provided, for example, laterally offset to an air inlet with the air inlet openings 25, e.g. is disposed at least partly below the air inlet, as shown in the exemplary embodiment in FIG. 3 and in the sectional view in FIG. 4.

Figure 4:
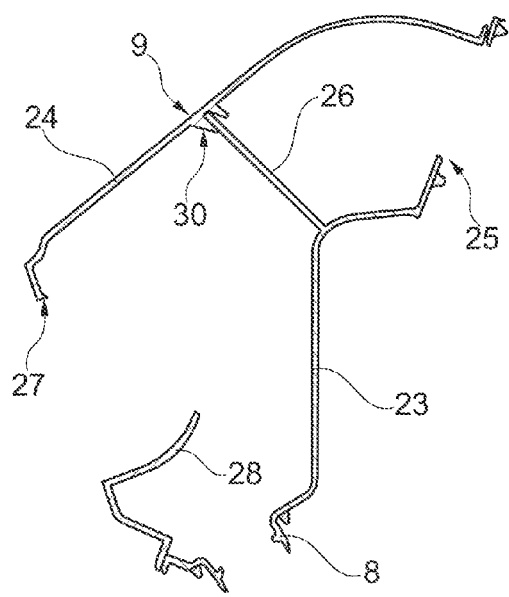
FIG. 4 shows a sectional view A-A of the inner water receiving device from FIG. 3.

FIG. 4 shows a sectional view A-A of the inner water separating container 9 from FIG. 3. In this case, the upper housing half 24 and the lower housing half 23 are shown with their water drain 8. The air outlet opening 27, which is provided, for example, in the upper housing half 24, is preferably provided elevated with respect to the lowest point or the water outlet 8 of the inner water separating container 9, here for example, the water outlet 8 of the lower housing half 24. In addition, the shielding wall 28 or shell can optionally be provided at least on the underside of the air outlet opening 27, which additionally shields the air outlet opening 27 with respect to the water drain 8 and the base of the inner water separating container 9 or the lower housing half 24, and forms a type of overflow edge. The shielding wall 28 or shell additionally prevents water, which can collect on the bottom of the inner water separating container 9 and cannot be satisfactorily removed immediately via the water drain 8, from being able to penetrate undesirably through the air outlet opening 27 from the inner water separating container 9, for example, into a connected air-conditioning and ventilation module.

The impact wall 26 is, for example, formed integrally with the lower housing half 23 and can be additionally connected to the upper housing half 24, as shown in the exemplary embodiment in FIG. 4. To this end the upper housing half 24 can be formed with a receptacle 30 for receiving the impact wall 26. The receptacle 30 can, for example, be configured as a slot or a recess, as shown in the exemplary embodiment in FIG. 4, into which the impact wall 26 can be introduced and thus held.

Figure 5:
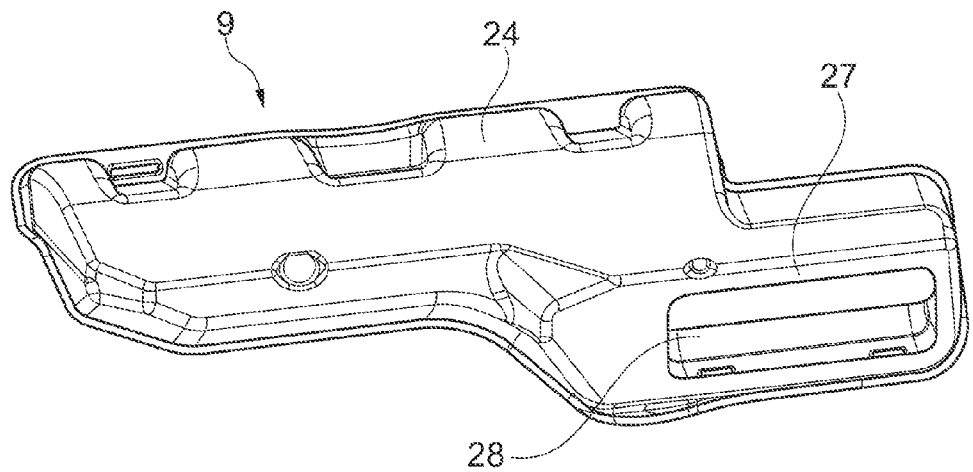
FIG. 5 shows a perspective view of the upper half of the inner water receiving device from outside according to FIG. 3.

FIG. 5 shows a perspective view of the upper housing half 24 of the inner water separating container 9 from outside from the direction of the air outlet opening 27 according to FIG. 3. The air outlet opening 27 comprises the shielding wall 28 or shell, which extends in the underside and if desired additionally at least along one section on one or both sides of the air outlet opening 27 for shielding the air outlet opening 27 laterally and downward to the bottom of the inner water separating container 9. Any undesired passage of water through the air outlet opening 27 can be additionally counteracted.

Figure 6:
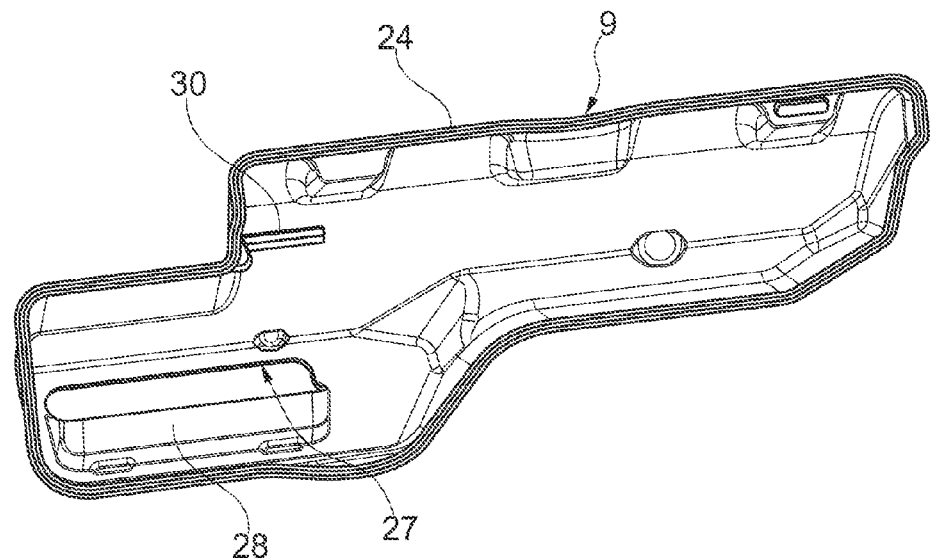
FIG. 6 shows a perspective view of the upper half of the inner water receiving device from inside according to FIG. 5.

Furthermore, FIG. 6 shows a perspective view of the upper housing half 24 of the inner water separating container 9 from inside according to FIG. 5. The air outlet opening 27 comprising the shielding wall 28 or shell is shown there. In addition, the receptacle 30 for receiving the impact wall 26 of the lower housing half 23 is shown.

Figure 7:
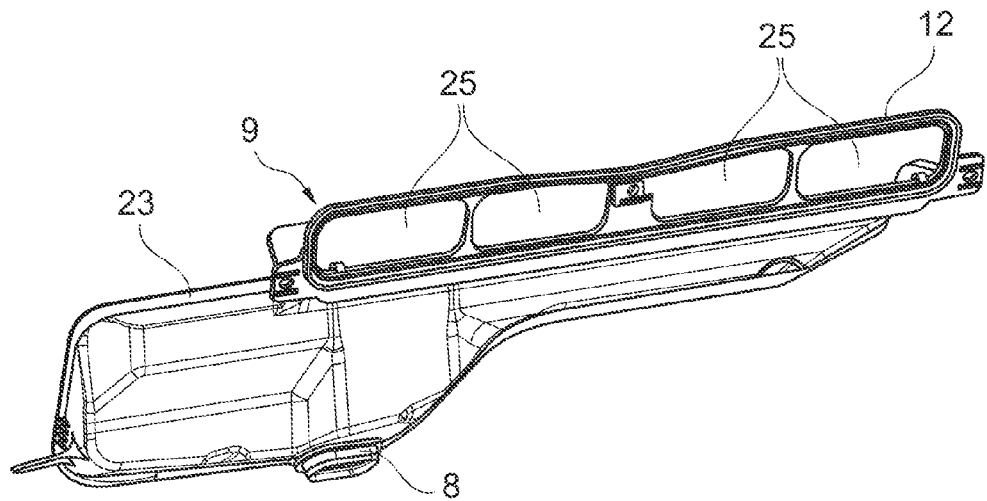
FIG. 7 shows a perspective view of the lower half of the inner water receiving device from outside according to FIG. 3.

FIG. 7 shows a perspective view of the lower housing half 23 of the inner water separating container 9 from outside according to FIG. 3. The lower housing half 23 has the air inlet openings 25 for introducing air, which flows via the outer water receiving device and the outer water receiving container (outer secondary plenum) into the inner water separating container 9. The impact wall 26 is provided opposite the air inlet openings 25. Also shown is the water drain 8 on which, for example, the valve flap 16 shown previously in FIGS. 1 and 2 or a hose (not shown) can optionally be fastened to remove water from the vehicle.

Figure 8:
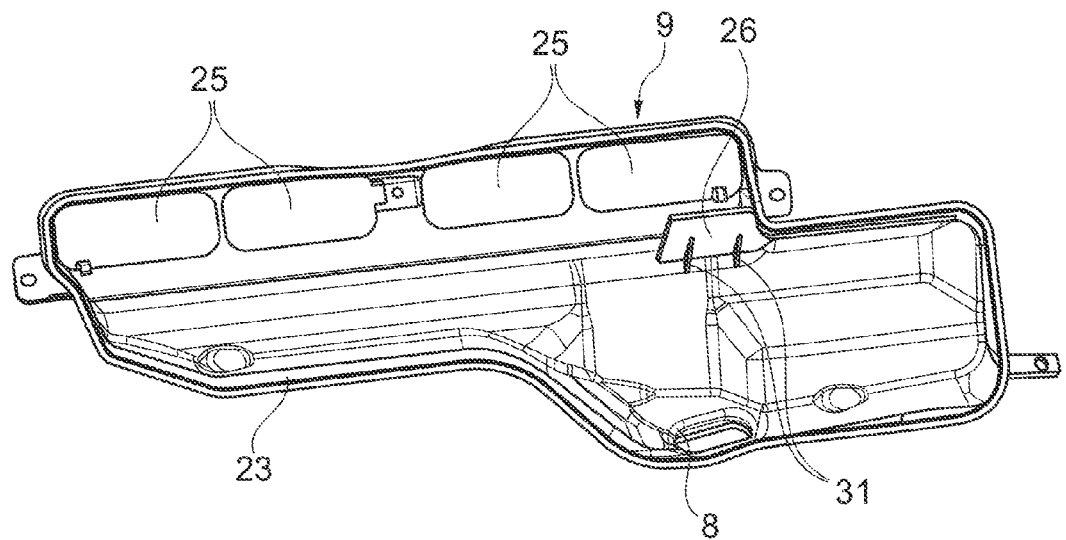
FIG. 8 shows a perspective view of the lower half of the inner water receiving device from inside according to FIG. 7.

FIG. 8 shows a perspective view of the lower housing half 23 of the inner water separating container 9 from FIG. 7 from inside. The impact wall 26 is, for example, formed in one piece with the upper housing half 24 and optionally has one or more supporting elements 30, e.g. supporting ribs. The supporting elements 30 are, for example, provided on the side of the impact wall 26 facing away from the air inlet openings 25.

The upper housing half 24 shown in FIGS. 5 and 6 and the lower housing half 23 shown in FIGS. 7 and 8 of the inner water separating container 9 can, for example, be made of plastic or a plastic combination or another suitable material or material combination such as, for example, metal. For example, both housing halves 23, 24 can be made of Polyfill with rock powder or POLYfill® HC (glass-fiber-reinforced polypropylene (PP)). The housing halves 23, 24 can, for example, be made in an injection molding process, in particular a tangential injection molding process. In addition, the two housing halves 23, 24 can preferably be tightly connected to one another, for example, by adhesive bonding, welding (in particular induction welding), soldering, and/or screwing etc.

Figure 9:
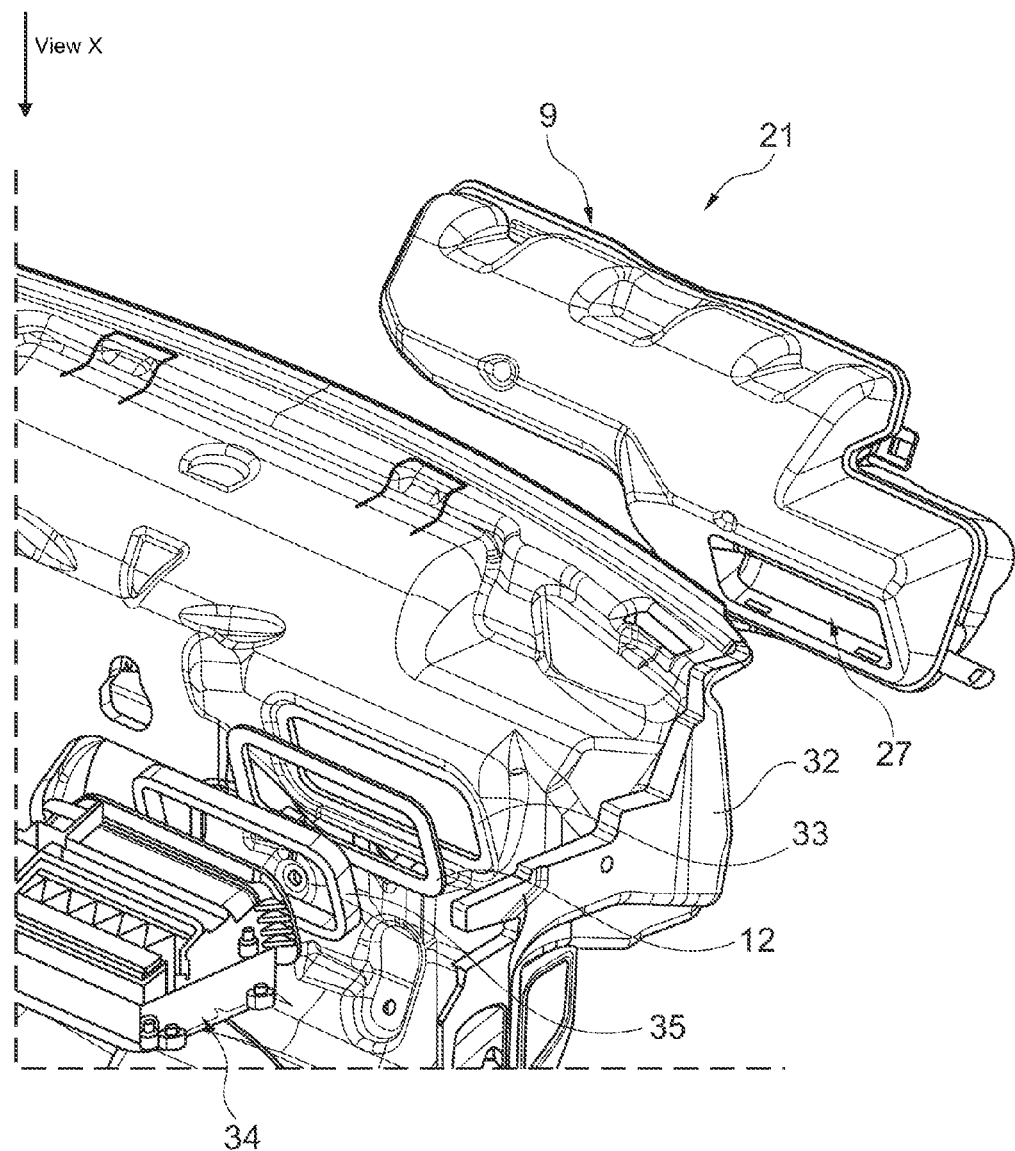
FIG. 9 shows an exploded view of the connection of the inner water receiving device to the interior insulation of a vehicle.

FIG. 9 shows an exploded view of the connection of the inner water separating container 9 to an interior insulation 32 of the vehicle. The inner water separating container 9 with its air outlet opening 27 is coupled to the interior insulation 32 and an opening 33 of the interior insulation 32. The interior insulation 32 with its opening 33 is in turn coupled to an HVAC module 34. In the exemplary embodiment in FIG. 9, only one housing of an intake channel of the HVAC module 34 is shown for reasons of clarity. In this case, for example, a sealing element 35, e.g. a foam, is provided which is connected to the HVAC module 34 and which, for example, can be additionally sealed by means of a fixing device, e.g. a fixing frame 12, with respect to the opening 33 of the interior insulation 32. The inner water separating container 9 abuts, for example with its air outlet opening 27 against the opening 33 of the interior insulation 32, where, for example, no additional seal needs to be provided between the two openings 27, 33 or between the inner water separating container 9 and the interior insulation 32.

Figure 10:
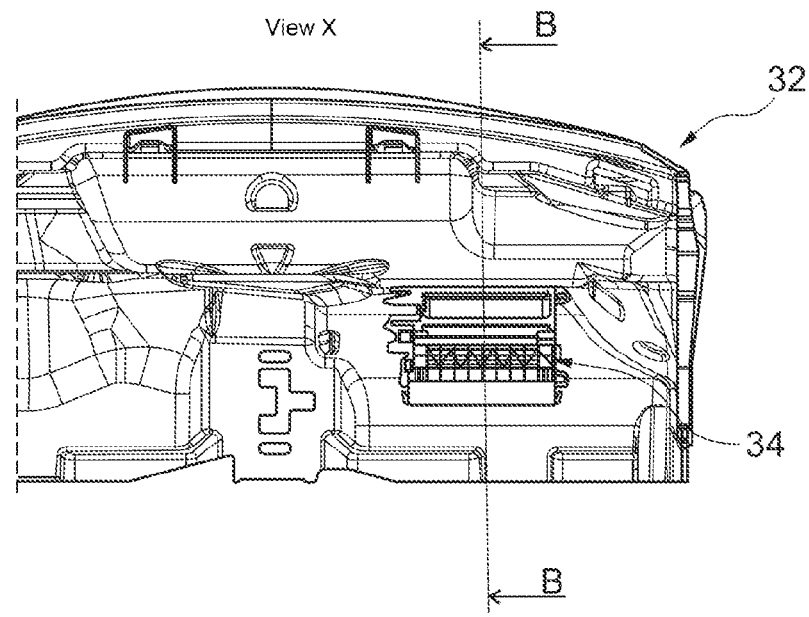
FIG. 10 shows a plan view of the interior insulation of the vehicle.

FIG. 10 shows a plan view of the interior insulation 32 of the vehicle according to FIG. 9, on which the inner water separating container 9 is disposed. In this case, as described previously, the housing of the intake channel of the HVAC module 34 is additionally shown. The HVAC module 34 sucks in air from outside the vehicle via at least one blower, where the sucked-in air flows through the outer water receiving device (outer main plenum), the outer water receiving container (outer secondary plenum), and then the inner water separating container and from there into the HVAC module 34 and then into the passenger compartment.

Figure 11:
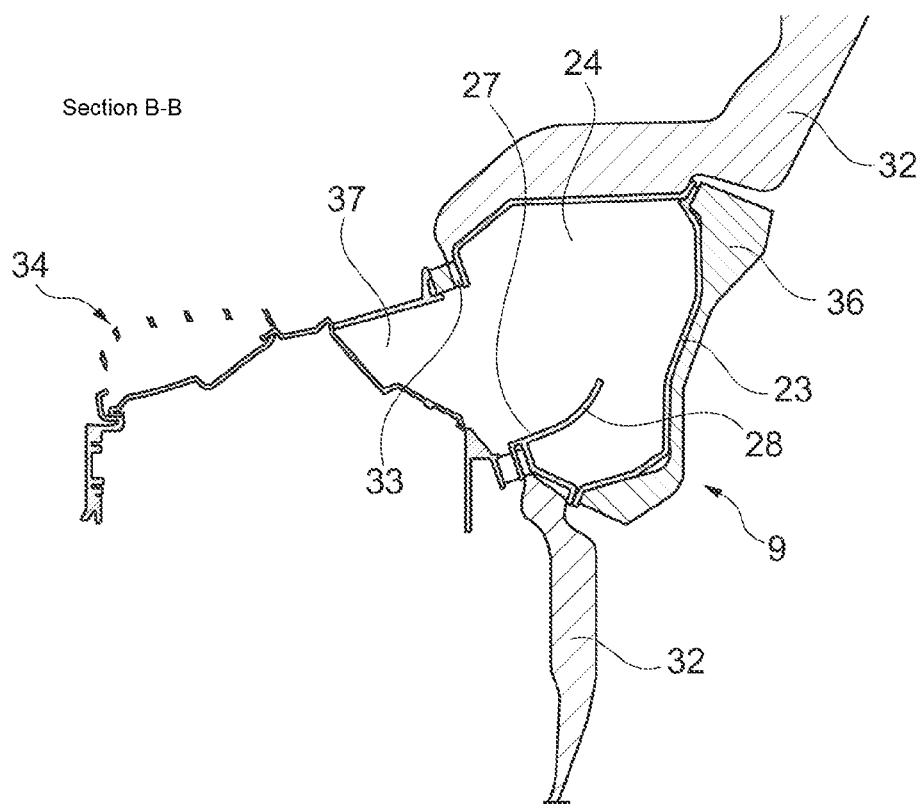
FIG. 11 shows a sectional view B-B through the interior insulation from FIG. 10.

A sectional view B-B through the interior insulation 32, the inner water separating container 9, and a part of the HVAC module 34 according to FIG. 10 is further shown in FIG. 11. The two housing halves 23, 24 of the inner water separating container 9 are shown here, where the upper housing half 24 comprises the shielding wall 28 or shell, which forms an overflow edge in order to avoid undesired flowing of water collected on the bottom of the lower housing half 23 through the air outlet opening 27.

The lower housing half 23 can optionally additionally be provided with a lining 36, for example, made of a rubber, natural rubber, and/or another damping material. The lining 26 is used to fill a space between the inner water separating container 9 and an adjoining engine compartment or a front wall, which separates the passenger compartment from the engine compartment, at least partially or substantially completely, in order for example to suppress engine noise from the engine compartment.

As shown in the exemplary embodiment in FIG. 11, the air outlet opening 27 of the inner water separating container 9, the opening 33 of the interior insulation 32, and an opening 37 of the HVAC module 34 or the intake channel are coupled to one another, for passing air from the inner water separating container 9 into the HVAC module 34.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A water separating container for a motor vehicle for passing through an air stream sucked in from outside the motor vehicle and for separating water present in the air stream, the water separating container comprising:
    an air inlet having an air inlet opening and an air outlet having an air outlet opening; and
    an impact wall for separating the water present in the air stream, the impact wall disposed between the air inlet and the air outlet;
    wherein the air outlet opening is provided with a shielding wall which extends at least along a lower side of the air outlet opening;
    wherein the shielding wall forms an overflow edge, configured to prevent an undesired flow of water through the air outlet opening.

2. The water separating container according to claim 1, wherein
    the water separating container is configured to deflect air flowing into the water separating container through the air inlet and guide it to the air outlet, wherein the air outlet is provided laterally offset to the air inlet and/or is disposed at least partially below the air inlet.

3. The water separating container according to claim 1, wherein
    the water separating container is configured to be multipart, wherein the water separating container configured to be multipart comprises a first upper and a second lower housing half, wherein the second lower housing half comprises the air inlet, the impact wall, and a water drain and wherein the first upper housing half comprises the air outlet and a receptacle for receiving and holding the impact wall.

4. The water separating container according to claim 1, wherein
    the impact wall is disposed in a transverse direction of the water separating container and terminates with a wall section of the water separating container or forms a gap with the wall section.

5. The water separating container according to claim 1, wherein
    the impact wall is disposed above the air outlet.

6. The water separating container according to claim 1, wherein
    the air outlet is elevated with respect to a base of the water separating container.

7. The water separating container according to claim 6, wherein
    the air outlet is elevated with respect to a water drain of the water separating container.

8. A motor vehicle comprising a water separating container for passing through an air stream sucked in from outside the motor vehicle and for separating water present in the air stream, the water separating container comprising:
    an air inlet which has an air inlet opening and an air outlet having an air outlet opening; and
    an impact wall for separating the water present in the air stream, the impact wall disposed between the air inlet and the air outlet;
    wherein the air outlet opening is provided with a shielding wall, which extends at least along a lower side of the air outlet opening;
    wherein the shielding wall forms an overflow edge, configured to prevent an undesired flow of water through the air outlet opening.

9. The motor vehicle according to claim 8, wherein
    the water separating container is disposed on a side of a passenger compartment of the motor vehicle.

10. The motor vehicle according to claim 8, wherein
    the water separating container is disposed in a passenger compartment of the motor vehicle below a dashboard and is connected to an interior insulation of the motor vehicle.

11. The motor vehicle according to claim 8, wherein
    the water separating container is coupled to a water receiving system which is provided in an engine compartment of the motor vehicle.

12. The motor vehicle according to claim 8, wherein
    the water separating container is configured to deflect air flowing into the water separating container through the air inlet and guide it to the air outlet, wherein the air outlet is provided laterally offset to the air inlet and/or is disposed at least partially below the air inlet.

13. The motor vehicle according to claim 8, wherein the water separating container is configured to be multipart, wherein the water separating container configured to be multipart comprises a first upper and a second lower housing half, wherein the second lower housing half comprises the air inlet, the impact wall, and a water drain and wherein the first upper housing half comprises the air outlet and a receptacle for receiving and holding the impact wall.

14. The motor vehicle according to claim 8, wherein the impact wall is disposed in a transverse direction of the water separating container and terminates with a wall section of the water separating container or forms a gap with the wall section.

15. The motor vehicle according to claim 8, wherein the impact wall is disposed above the air outlet.

16. The motor vehicle according to claim 8, wherein the air outlet is elevated with respect to a base of the water separating container.

17. The motor vehicle according to claim 16, wherein the air outlet is elevated with respect to a water drain of the water separating container.

18. The water separating container according to claim 1, wherein the shielding wall comprises a shell.

19. The motor vehicle according to claim 8, wherein the shielding wall comprises a shell.

* * * * *